US012082260B2

(12) United States Patent
Turtinen et al.

(10) Patent No.: US 12,082,260 B2
(45) Date of Patent: Sep. 3, 2024

(54) INCREASING PREAMBLE TRANSMISSION OPPORTUNITIES FOR RANDOM ACCESS IN UNLICENSED BAND

(71) Applicant: Nokia Technologies Oy, Espoo (FI)

(72) Inventors: Samuli Turtinen, Ii (FI); Chunli Wu, Beijing (CN); Sami Hakola, Kempele (FI)

(73) Assignee: Nokia Technologies Oy, Espoo (FI)

( * ) Notice: Subject to any disclaimer, the term of this patent is extended or adjusted under 35 U.S.C. 154(b) by 409 days.

(21) Appl. No.: 17/430,170

(22) PCT Filed: Feb. 14, 2019

(86) PCT No.: PCT/CN2019/075128
§ 371 (c)(1),
(2) Date: Aug. 11, 2021

(87) PCT Pub. No.: WO2020/164079
PCT Pub. Date: Aug. 20, 2020

(65) Prior Publication Data
US 2022/0159727 A1    May 19, 2022

(51) Int. Cl.
*H04W 74/08* (2024.01)
*H04W 16/14* (2009.01)
*H04W 74/0833* (2024.01)

(52) U.S. Cl.
CPC ....... *H04W 74/0833* (2013.01); *H04W 16/14* (2013.01)

(58) Field of Classification Search
CPC .......................... H04W 74/0833; H04W 16/14
See application file for complete search history.

(56) References Cited

U.S. PATENT DOCUMENTS

2009/0316593 A1   12/2009   Wang et al.
2017/0048880 A1   2/2017    Anderson et al.
(Continued)

FOREIGN PATENT DOCUMENTS

CN   102077676 A   5/2011
CN   105611637 A   5/2016
(Continued)

OTHER PUBLICATIONS

Intel Corporation "Random Access Procedure for NR-u" 3GPP TSG-RAN WG2 NR Meeting #102. R2-1807355. May 21-25, 2018.

*Primary Examiner* — Ronald B Abelson
(74) *Attorney, Agent, or Firm* — Harrington & Smith

(57) ABSTRACT

In accordance with some embodiments, a method may include selecting, by a user equipment, at least one random access occasion associated with at least one contention based random access resource and at least one random access occasion associated with at least one contention free random access resource. The method may further include detecting, by the user equipment, a predetermined number of listen before talk failures associated with one or more of the at least one random access occasion associated with at least one contention free random access resource. The method may further include transmitting, by the user equipment, in response to detecting a predetermined number of listen before talk failures, according to the selected at least one random access occasion associated with at least one contention based random access resource.

16 Claims, 2 Drawing Sheets

(56) References Cited

U.S. PATENT DOCUMENTS

| | | |
|---|---|---|
| 2017/0142746 A1 | 5/2017 | Koorapaty et al. |
| 2018/0049243 A1 | 2/2018 | Lee et al. |
| 2018/0184475 A1 | 6/2018 | Babaei et al. .................... 76/15 |
| 2019/0037605 A1 | 1/2019 | Agiwal et al. .................. 74/833 |
| 2021/0243808 A1* | 8/2021 | Deenoo .................. H04L 5/005 |

FOREIGN PATENT DOCUMENTS

| | | |
|---|---|---|
| WO | 2016025899 A1 | 2/2016 |
| WO | WO 2017/136458 A2 | 8/2017 |
| WO | WO-2017/171999 A1 | 10/2017 |
| WO | WO 2017/180045 A1 | 10/2017 |
| WO | WO-2018/174687 A1 | 9/2018 |
| WO | WO-2018/175721 A1 | 9/2018 |

* cited by examiner

INCREASING PREAMBLE TRANSMISSION OPPORTUNITIES FOR RANDOM ACCESS IN UNLICENSED BAND

CROSS REFERENCE TO RELATED APPLICATION

This patent application is a U.S. National Stage application of International Patent Application Number PCT/CN2019/075128 filed Feb. 14, 2019, which is hereby incorporated by reference in its entirety.

BACKGROUND

Field

Certain embodiments may relate to communication systems. For example, some embodiments may relate to random access procedures.

Description of the Related Art

Under 3GPP, user equipment may prioritize beams associated with contention free random access (CFRA) resources, such as synchronization signal blocks (SSB) and channel state information reference signals (CSI-RS), over other beams during a selection procedure. For example, certain beams may be prioritized according to a threshold, such as a reference signal received power (RSRP) threshold. Where no such beam below the threshold exists to prioritize, user equipment may prioritize beams which are above the threshold, such as beams associated with contention based random access (CBRA) resources, and where no beam is above the threshold, the user equipment may select any SSB, and corresponding physical random access channel (PRACH) preamble, for transmission with CBRA. In such a scenario, CFRA resources may be allocated for the user equipment to use for handover (HO), beam failure recovery (BFR), and/or uplink time acquisition through physical downlink control channel (PDCCH) order.

SUMMARY

In accordance with some embodiments, a method may include selecting, by a user equipment, at least one random access occasion associated with at least one contention based random access resource and at least one random access occasion associated with at least one contention free random access resource. The method may further include detecting, by the user equipment, a predetermined number of listen before talk failures associated with one or more of the at least one random access occasion associated with at least one contention free random access resource. The method may, in response to detecting a predetermined number of listen before talk failures, further include transmitting, by the user equipment, according to the selected at least one random access occasion associated with at least one contention based random access resource.

In accordance with some embodiments, an apparatus may include means for selecting at least one random access occasion associated with at least one contention based random access resource and at least one random access occasion associated with at least one contention free random access resource. The apparatus may further include means for detecting a predetermined number of listen before talk failures associated with one or more of the at least one random access occasions associated with at least one contention free random access resource. The apparatus may further include means for transmitting according to the selected at least one random access occasion associated with at least one contention based random access resource.

In accordance with some embodiments, an apparatus may include at least one processor and at least one memory including computer program code. The at least one memory and the computer program code may be configured to, with the at least one processor, cause the apparatus to at least select at least one random access occasion associated with at least one contention based random access resource and at least one random access occasion associated with at least one contention free random access resource. The at least one memory and the computer program code may be further configured to, with the at least one processor, cause the apparatus to at least detect a predetermined number of listen before talk failures associated with one or more of the at least one random access occasion associated with at least one contention free random access resource. The at least one memory and the computer program code may be further configured to, with the at least one processor, cause the apparatus to, in response to detecting a predetermined number of listen before talk failures, at least transmit according to the selected at least one random access occasion associated with at least one contention based random access resource.

In accordance with some embodiments, a non-transitory computer readable medium may be encoded with instructions that may, when executed in hardware, perform a method. The method may select at least one random access occasion associated with at least one contention based random access resource and at least one random access occasion associated with at least one contention free random access resource. The method may further detect a predetermined number of listen before talk failures associated with one or more of the at least one random access occasion associated with at least one contention free random access resource. The method may further, in response to detecting a predetermined number of listen before talk failures, transmit according to the at least one random access occasion associated with at least one contention based random access resource.

In accordance with some embodiments, a computer program product may perform a method. The method may select at least one random access occasion associated with at least one contention based random access resource and at least one random access occasion associated with at least one contention free random access resource. The method may further detect a predetermined number of listen before talk failures associated with one or more of the at least one random access occasion associated with at least one contention free random access resource. The method may further, in response to detecting a predetermined number of listen before talk failures, transmit according to the at least one random access occasion associated with at least one contention based random access resource.

In accordance with some embodiments, an apparatus may include circuitry configured to select at least one random access occasion associated with at least one contention based random access resource and at least one random access occasion associated with at least one contention free random access resource. The circuitry may further detect a predetermined number of listen before talk failures associated with one or more of the at least one random access occasion associated with at least one contention free random access resource. The circuitry may, in response to detecting a predetermined number of listen before talk failures, further transmit according to the at least one random access occasion associated with at least one contention based random access resource.

BRIEF DESCRIPTION OF THE DRAWINGS

For proper understanding of this disclosure, reference should be made to the accompanying drawings, wherein.

DETAILED DESCRIPTION

Beams allocated with CFRA preambles, and their allocated RACH occasions, may be prioritized by a user equipment during a random access resource selection procedure where the beams exceed a RSRP threshold. However, where those beams and/or associated frequency subchannels of the RACH occasions allocated with CFRA resources experience on-going LBT failure when attempting to transmit the CFRA preamble, challenges may arise where the user equipment may select a beam and/or frequency subchannel which may not have the same difficulty. For example, the user equipment may use SSB and/or CSI-RS measurements to identify strong beams associated with CFRA preambles but experience frequent LBT failure. Thus, current techniques result in a long latency of random access procedures, leading to uplink radio link failure detection and/or handover failure, as well as diminished user experience and reduced advantages of utilizing unlicensed spectrum.

Certain embodiments described herein may enable user equipment to determine valid random access preamble transmission opportunities and/or RACH occasions based on beam and/or listen before talk subchannels associated with CBRA resources using network-configured rules and/or conditions where the beams and/or subchannels associated with CFRA resources experience LBT problems. Certain embodiments are, therefore, directed to improvements in computer-related technology, specifically, by enhancing PDCCH-ordered random access by enabling a network to provide additional preamble transmission opportunities in time and frequency. In addition, certain embodiments may allow user equipment to attempt to use different beams and/or LBT subchannels than the ones allocated with CFRA resources which are overloaded, as well as where LBT prevents the user equipment from accessing RACH using the CFRA resources. In addition, certain embodiments may allow the UE to attempt to use multiple CFRA resources associated with multiple PDCCH orders, and may reduce the latency of the RA procedure, ultimately preventing UL RLF or handover failure detection. Certain embodiments may further conserve network resources and reduce power consumption of network entities and/or user equipment located within the network by reducing redundant operations.

It should be understood that contention based random access (CBRA) resources may hereinafter refer to one random access channel (RACH) occasion associated with CBRA preamble and/or contention free random access (CFRA) resource may refer to one random access channel (RACH) occasion associated with CFRA preamble. One random access channel occasion may comprise of multiple CBRA preambles and/or multiple CFRA preambles. One CBRA resource may refer to one CBRA preamble, and one CFRA resource may refer to one CFRA preamble. Random access channel occasion may also be referred to as random access occasion.

Figure 1:
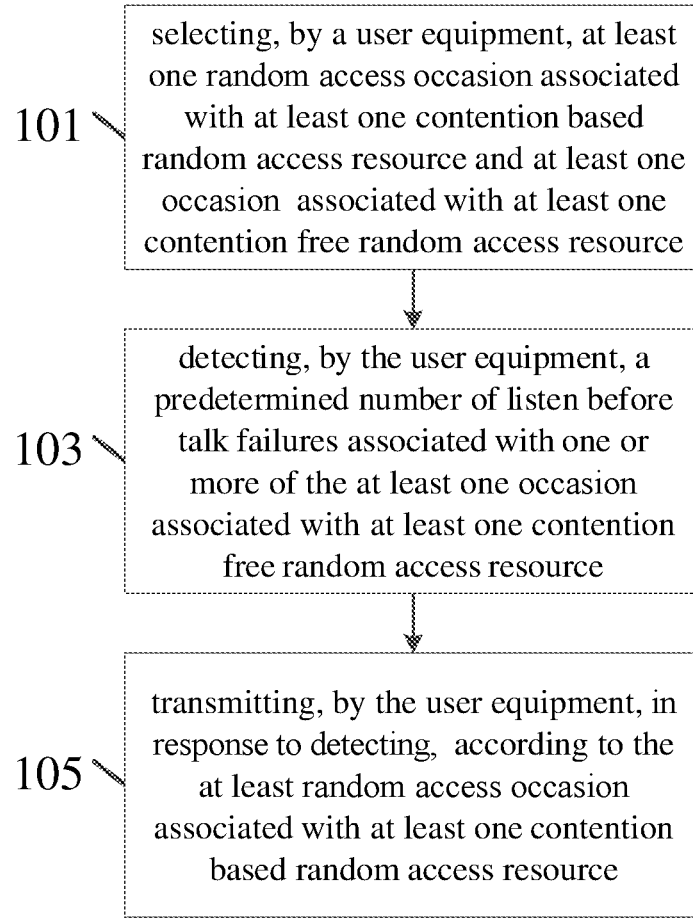
FIG. 1 illustrates an example of a method performed by a user equipment according to certain embodiments.
Figure 2:
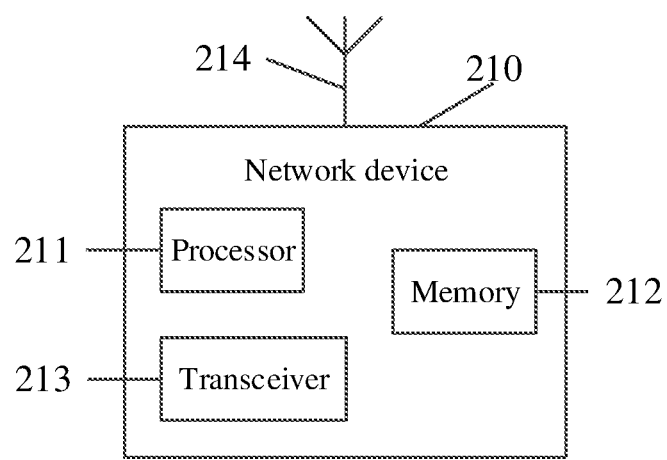
FIG. 2 illustrates an example of a system according to certain embodiments.

FIG. 1 illustrates an example of a method performed by user equipment, such as user equipment 210 in FIG. 2. In step 101, the user equipment may select at least one beam associated with at least one contention based random access resource along with selecting the at least one beam associated with at least one contention free random access resource. In some embodiments, the selection may be based upon at least one beam selection rule. For example, the at least one beam selection rule may require satisfaction of a first predefined signal level threshold for each selected contention based random access beam. Additionally or alternatively, the selection may be based upon a highest reference signal received power or the selection may be based upon UE implementation where only beams and/or listen before talk sub channels with contention based random access resources are associated with successful listen before talk.

In certain embodiments, the first predefined signal level threshold associated with contention based random access may be higher than a second predefined signal level threshold associated with contention free random access. Furthermore, for example, the first predefined signal level threshold may be the second predefined signal level threshold. For example, one or both of the first predefined signal level threshold and second predefined signal level threshold may be associated with one or more of reference signal received power (RSRP), reference signal received quality (RSRQ), received signal strength indicator (RSSI), and signal-to-interference-plus-noise ratio (SINR). Additionally or alternatively, the selection may be performed according to at least one offset value of the second predefined signal level threshold. For example, where a CBRA beam RSRP is offset more than a second RSRP threshold to select a CFRA beam, the CBRA beam may be used for preamble transmission candidate along with at least one CFRA beam.

According to various embodiments, at least one contention based random access resource may be selected which may be associated with at least one listen before talk subchannel along with selecting at least one contention free random access resource allocated on at least one listen before talk subchannel. According to additional embodiments, at least one contention based random access resource may be selected which may be associated with at least one beam and at least one contention free random access resource when at least one contention free random access resource and at least one contention based random access resource is configured for at least one beam associated with different listen before talk subchannels. For example, the user equipment may be restricted to select a CBRA preamble in the random access procedure as a candidate preamble if the CBRA preamble is associated with the same beam (SSB index and/or CSI-RS resource) as the one associated with CFRA resources in case the CFRA resource has experienced LBT failures previously.

In step 103, the user equipment may detect a predetermined number of listen before talk failures associated with one or more of the at least one beam associated with at least one contention free random access resource.

In some embodiments, the predetermined number of listen before talk failures is compared against the cumulative number of listen before talk failures occurring across all beams and/or listen before talk subchannels associated with contention free random access resources. In certain embodiments, the detection may be based upon at least one counter of number of listen before talk failures configured to reset or not reset upon a successful preamble transmission. In certain embodiments, the predetermined number of listen before talk failures may be a network-configured parameter for the user equipment or it may be fixed into specifications. In certain embodiments, the predetermined number of listen before talk failures may be one, for example, every time LBT failure happens for contention free random access, usage of contention based random access may be permitted.

According to certain embodiments, at least one network-configured parameter may depend on the use its configured for, for example, a different number of LBT failures may be applied for handover than configured for beam failure recovery. In such cases, these parameters may be configured for the UE in a dedicated manner. For PDCCH-ordered CFRA, parameters may be configured for a particular UE, provided over system information broadcast, and/or provided in the actual PDCCH order.

In step 105, the user equipment may transmit according to the at least one beam and/or at least one listen before talk subchannel associated with at least one contention based random access resource. According to certain embodiments, the transmitting may be performed according to at least one predefined time period associated with the use of at least one contention based random access resource and at least one contention free random access resource. For example, upon LBT failing for a planned CFRA transmission, if the user equipment determines that a time until a next valid CFRA resource is greater than the time period, the user equipment may select the CBRA resource as described in any of the above options, despite no CFRA resources being available at the same time point. In certain embodiments, upon LBT failing for planned CFRA transmissions has reached the predetermined number of listen before talk failures, the user equipment may select the CBRA resource at any time point as described in any of the above options, despite no CFRA resources being available at the same time point.

In certain embodiments, a PDCCH order may include at least one SSB and/or at least one RO index for the secondary CFRA resource, in addition to primary CFRA resource. If the UE determines that at least one primary CFRA resource is blocked due to a LBT failure, the UE may use the secondary CFRA resource. For example, under 3GPP Release 15, 10 bits are reserved in PDCCH order. Thus, the SSB index may consume 6 bits, while a PRACH mask index may consume 4 bits. The PDCCH order could then carry a SSB index and a PRACH mask index for both the primary CFRA resource as well as for the secondary CFRA resource. Alternatively or additionally, the at least one secondary CFRA resource may use the same PRACH mask index as provided for the primary CFRA resource.

According to certain embodiments, secondary resources may be applied depending on the primary CFRA resource being blocked by LBT a consecutive number of times, such as according to the counter of number of listen before talk failures described above or in case even single LBT failure is experienced on the primary CFRA resource. Alternatively or additionally, for an PDCCH ordered RACH case, a PDCCH order may also include subband/subchannel indices that the UE may try attempt to use as the CFRA resource. For example, with wideband UE, where a UE supports operation across multiple subbands, the UE may transmit PRACH preamble on one of the multiple subbands contiguous in frequency. Upon reception of the subband indices in PDCCH order, the UE may have multiple subbands on which to try the certain CFRA resource.

In some embodiments, at least one beam and/or listen before talk subchannel associated with successful contention free random access resource associated with successful listen before talk may be prioritized over at least one beam and/or listen before talk subchannel associated with only contention based random access resources. Additionally or alternatively, if only beams and/or LBT subchannels with CBRA resources succeed the LBT, the highest RSRP may be used to select the beam to transmit to, or this determination may be performed by the UE.

FIG. 2 illustrates an example of a system according to certain embodiments. In one embodiment, a system may include, for example, network device 210.

Network device 210 may include one or more of a user equipment, mobile device, such as a mobile phone, smart phone, personal digital assistant (PDA), tablet, or portable media player, digital camera, pocket video camera, video game console, navigation unit, such as a global positioning system (GPS) device, desktop or laptop computer, single-location device, such as a sensor or smart meter, or any combination thereof.

Network device 210 may be one or more of a base station, such as an evolved node B (eNB) or 5G or New Radio node B (gNB), a serving gateway, a server, and/or any other access node or combination thereof. Furthermore, network device 210 may be one or more of a citizens broadband radio service device (CBSD).

One or more of these devices may include at least one processor, indicated at 211. Processor 211 may be embodied by any computational or data processing device, such as a central processing unit (CPU), application specific integrated circuit (ASIC), or comparable device. The processors may be implemented as a single controller, or a plurality of controllers or processors.

At least one memory may be provided in one or more of devices, indicated at 212. The memory may be fixed or removable. The memory may include computer program instructions or computer code contained therein. Memory 212 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate from the one or more processors. Furthermore, the computer program instructions stored in the memory and which may be processed by the processors may be any suitable form of computer program code, for example, a compiled or interpreted computer program written in any suitable programming language. Memory may be removable or non-removable.

Processor 211 and memory 212 or a subset thereof, may be configured to provide means corresponding to the various blocks of FIG. 1. Although not shown, the devices may also include positioning hardware, such as GPS or micro electrical mechanical system (MEMS) hardware, which may be used to determine a location of the device. Other sensors are also permitted and may be included to determine location, elevation, orientation, and so forth, such as barometers, compasses, and the like.

As shown in FIG. 2, transceiver 213 may be provided, and one or more devices may also include at least one antenna, illustrated as 214. The device may have many antennas, such as an array of antennas configured for multiple input multiple output (MIMO) communications, or multiple antennas for multiple radio access technologies. Other configurations of these devices, for example, may be provided. Transceiver 213 may be a transmitter, a receiver, or both a transmitter and a receiver, or a unit or device that may be configured both for transmission and reception.

The memory and the computer program instructions may be configured, with the processor for the particular device, to cause a hardware apparatus such as user equipment to perform any of the processes described below (see, for example, FIG. 1). Therefore, in certain embodiments, a non-transitory computer-readable medium may be encoded with computer instructions that, when executed in hardware, perform a process such as one of the processes described herein. Alternatively, certain embodiments may be performed entirely in hardware.

In certain embodiments, an apparatus may include circuitry configured to perform any of the processes or functions illustrated in FIG. 1. For example, circuitry may be hardware-only circuit implementations, such as analog and/or digital circuitry. In another example, circuitry may be a combination of hardware circuits and software, such as a combination of analog and/or digital hardware circuit(s) with software or firmware, and/or any portions of hardware processor(s) with software (including digital signal processor(s)), software, and at least one memory that work together to cause an apparatus to perform various processes or functions. In yet another example, circuitry may be hardware circuit(s) and or processor(s), such as a microprocessor(s) or a portion of a microprocessor(s), that include software, such as firmware for operation. Software in circuitry may not be present when it is not needed for the operation of the hardware.

The features, structures, or characteristics of certain embodiments described throughout this specification may be combined in any suitable manner in one or more embodiments. For example, the usage of the phrases "certain embodiments," "some embodiments," "other embodiments," or other similar language, throughout this specification refers to the fact that a particular feature, structure, or characteristic described in connection with the embodiment may be included in at least one embodiment of the present invention. Thus, appearance of the phrases "in certain embodiments," "in some embodiments," "in other embodiments," or other similar language, throughout this specification does not necessarily refer to the same group of embodiments, and the described features, structures, or characteristics may be combined in any suitable manner in one or more embodiments.

One having ordinary skill in the art will readily understand that certain embodiments discussed above may be practiced with steps in a different order, and/or with hardware elements in configurations which are different than those which are disclosed. Therefore, it would be apparent to those of skill in the art that certain modifications, variations, and alternative constructions would be apparent, while remaining within the spirit and scope of the invention. In order to determine the metes and bounds of the invention, therefore, reference should be made to the appended claims.

Partial Glossary

3GPP 3rd Generation Partnership Project
5G 5th Generation Wireless System
BFR Beam Failure Recovery
CBRA Contention Based Random Access
CFRA Contention Free Random Access
CSI-RS Channel State Information Reference Signal
DRS Downlink Reference Signal
HO Handover
eNB evolved Node B
E-UTRAN Evolved Universal Mobile Telecommunications System Terrestrial Radio Access Network
gNB Next Generation Node B
LBT Listen Before Talk
LTE Long Term Evolution
MAC Medium Access Control
MIMO Multiple Input Multiple Output
NE Network Entity
NR New Radio
PBCH Physical Broadcast Channel
PRACH Physical Random Access Channel
QCL Quasi Co-Location
RA Random Access
RACH Random Access Channel
RO Random Access Channel Occasion
RS Reference Signal
RSRP Reference Signal Received Power
RSRQ Reference Signal Received Quality
RSSI Received Signal Strength Indicator
SINR Signal-to-Interference-plus-Noise Ratio
SS Synchronization Signal
SSB Synchronization Signal Block
UE User Equipment
UL Uplink

What is claimed is:

1. An apparatus, comprising:
at least one processor; and
at least one memory including computer program code, wherein the at least one memory and the computer program code are configured to, with the at least one processor, cause the apparatus to:
select at least one random access occasion associated with at least one contention based random access resource and select at least one random access occasion associated with at least one contention free random access resource,
wherein the selection is based upon at least one random access occasion selection rule, and
wherein the at least one random access occasion selection rule requires: satisfaction of a second predefined signal level threshold for the at least one contention free random access resource, and
satisfaction of a first predefined signal level threshold for the at least one contention based random access resource;
detect a predetermined number of listen before talk failures associated with one or more of the at least one random access occasion associated with the at least one contention free random access resource; and
in response to detecting a predetermined number of listen before talk failures, transmit according to the selected at least one random access occasion associated with the at least one contention based random access resource.

2. The apparatus according to claim 1, wherein the first predefined signal level threshold associated with the at least one contention based random access resource is higher than the second predefined signal level threshold associated with the at least one contention free random access resource.

3. The apparatus according to claim 1, wherein one or both of the first predefined signal level threshold and second predefined signal level threshold is associated with one or more of reference signal received power, reference signal received quality, received signal strength indicator, and signal-to-interference-plus-noise ratio.

4. The apparatus according to claim 1, wherein the first predefined signal level threshold is higher than the second predefined signal level threshold by an offset value.

5. The apparatus according to claim 1, wherein the predetermined number of listen before talk failures is compared against a cumulative number of listen before talk failures occurring at least one of: within the selected at least one random access occasion associated with at least one contention free random access resource; within the selected at least one random access occasion associated with at least one contention free random access resource over a predetermined duration of time; within all random access occasions associated with all contention free random access resources; and within all random access occasions associated with all contention free random access resources over a predetermined duration of time.

6. The apparatus according to claim 1, wherein the a listen before talk failure is associated with a failed preamble attempt.

7. The apparatus according to claim 1, wherein the predetermined number of listen before talk failures is one.

8. The apparatus according to claim 1, wherein the detection is based upon at least one counter of number of listen before talk failures configured to reset upon a successful preamble transmission.

9. The apparatus according to claim 1, wherein the detection is based upon at least one counter of number of listen before talk failures configured to not reset upon a successful preamble transmission.

10. The apparatus according to claim 1, wherein the transmitting is performed according to at least one predefined time period associated with the use of the at least one contention based random access resource and the at least one contention free random access resource.

11. The apparatus according to claim 1, wherein a random access occasion comprises at least one of a beam or a listen before talk subchannel.

12. A method comprising:
    selecting at least one random access occasion associated with at least one contention based random access resource and selecting at least one random access occasion associated with at least one contention free random access resource,
    wherein the selection is based upon at least one random access occasion selection rule, and
    wherein the at least one random access occasion selection rule requires: satisfaction of a second predefined signal level threshold for the at least one contention free random access resource, and
        satisfaction of a first predefined signal level threshold for the at least one contention based random access resource;
    detecting a predetermined number of listen before talk failures associated with one or more of the at least one random access occasion associated with the at least one contention free random access resource; and
    in response to detecting a predetermined number of listen before talk failures, transmitting according to the selected at least one random access occasion associated with the at least one contention based random access resource.

13. A non-transitory computer-readable medium encoding instructions that, when executed in hardware, perform a process according to claim 12.

14. The method of claim 12, wherein the first predefined signal level threshold associated with the at least one contention based random access resource is higher than the second predefined signal level threshold associated with the at least one contention free random access resource.

15. The method of claim 12, wherein one or both of the first predefined signal level threshold and second predefined signal level threshold is associated with one or more of reference signal received power, reference signal received quality, received signal strength indicator, and signal-to-interference-plus-noise ratio.

16. The method of claim 12, wherein the first predefined signal level threshold is higher than the second predefined signal level threshold by an offset value.

* * * * *